US009973371B1

(12) United States Patent
Upadhyay et al.

(10) Patent No.: US 9,973,371 B1
(45) Date of Patent: May 15, 2018

(54) REQUESTING A SPECIFIC WEBSITE VERSION

(75) Inventors: Piyush X. Upadhyay, Mission, KS (US); Badri P. Subramanyah, Overland Park, KS (US); John W. Davis, Kansas City, MO (US); Ayodeji Abidogun, Overland Park, KS (US); Lyle T. Bertz, Lee's Summit, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 1508 days.

(21) Appl. No.: 12/192,313

(22) Filed: Aug. 15, 2008

(51) Int. Cl.
H04L 29/08 (2006.01)

(52) U.S. Cl.
CPC .............. *H04L 29/08072* (2013.01)

(58) Field of Classification Search
USPC ........................................ 709/218
See application file for complete search history.

(56) References Cited

U.S. PATENT DOCUMENTS

| | | | |
|---|---|---|---|
| 5,761,662 A * | 6/1998 | Dasan | |
| 6,167,441 A * | 12/2000 | Himmel | 709/217 |
| 6,336,137 B1 * | 1/2002 | Lee et al. | 709/219 |
| 6,433,794 B1 * | 8/2002 | Beadle et al. | 715/700 |
| 6,519,617 B1 * | 2/2003 | Wanderski et al. | 715/235 |
| 6,526,426 B1 * | 2/2003 | Lakritz | 715/264 |
| 6,684,257 B1 * | 1/2004 | Camut et al. | 709/246 |
| 6,741,853 B1 * | 5/2004 | Jiang et al. | 455/418 |
| 6,966,034 B2 * | 11/2005 | Narin | 715/744 |
| 7,032,036 B2 * | 4/2006 | Linsley | 709/250 |
| 7,111,229 B2 * | 9/2006 | Nicholas et al. | 715/209 |
| 7,545,386 B2 * | 6/2009 | Marsyla et al. | 345/600 |
| 7,921,372 B2 * | 4/2011 | Sauve et al. | 715/767 |
| 7,970,816 B2 * | 6/2011 | Chess et al. | 709/203 |
| 2002/0103933 A1 * | 8/2002 | Garon et al. | 709/246 |
| 2004/0012627 A1 * | 1/2004 | Zakharia et al. | 345/744 |
| 2004/0133635 A1 * | 7/2004 | Spriestersbach et al. | 709/203 |
| 2005/0015474 A1 * | 1/2005 | Kavacheri et al. | 709/223 |
| 2006/0062362 A1 * | 3/2006 | Davis | 379/100.13 |
| 2007/0254635 A1 * | 11/2007 | Montelius | 455/414.1 |
| 2008/0201489 A1 * | 8/2008 | Morinaga | 709/246 |
| 2008/0282179 A1 * | 11/2008 | Kim et al. | 715/769 |
| 2009/0210514 A1 * | 8/2009 | Davis et al. | 709/219 |

OTHER PUBLICATIONS

"Ietabs", http://web.archive.org/web/20051125104527/http://ietab.mozdev.org/, Nov. 25, 2005 printed Mar. 27, 2010.*
R.Fielding et al, "Hypertext Transfer Protocol—Http/1.1", Jun. 1999, all pages.*

\* cited by examiner

*Primary Examiner* — Ryan Jakovac (57) ABSTRACT

A system, method, and computer-readable media are described for allowing a user to request a version of a website. In one embodiment, a user interface is provided that allows the user to specify the version of the website. The request is sent to the web server hosting the website. The web server retrieves the requested version of the website and transmits it to the requesting web browser.

6 Claims, 8 Drawing Sheets

ent web browsers or classes of web browsers. For example, a version of a website may be optimized for display on a mobile telephone or with a particular company's web browser. Typically, a content provider will chose the website version based on characteristics of the requesting web browser. Embodiments of the present invention provide a user interface that allows a user to select a website version. The requested website version is then sent to the web server. The web server then provides the requested website version to the requesting web browser without considering the characteristics of the requesting web browser.

REQUESTING A SPECIFIC WEBSITE VERSION

SUMMARY

The present invention is defined by the claims below. Embodiments of the present invention allow a user to specify the website version returned by a content provider. Many content providers build multiple versions of a single website. Each version is optimized for viewing with different web browsers or classes of web browsers. For example, a version of a website may be optimized for display on a mobile telephone or with a particular company's web browser. Typically, a content provider will chose the website version based on characteristics of the requesting web browser. Embodiments of the present invention provide a user interface that allows a user to select a website version. The requested website version is then sent to the web server. The web server then provides the requested website version to the requesting web browser without considering the characteristics of the requesting web browser.

In a first illustrative embodiment, one or more computer-readable media having computer-executable instructions embodied thereon for performing a method of requesting a version of a website are provided. The method includes displaying a user interface enabling a user to specify the version of the website and receiving a selection of the version of the website from the user. The method also includes generating a request for the version of the website corresponding to the user's selection based on a type of web browser. The method also includes transmitting the request to a web server hosting the website.

In another illustrative embodiment, one or more computer-readable media having computer-executable instructions embodied thereon for performing a method of presenting a version of a website in response to a request from a web browser are provided. The method includes receiving the request from the web browser indicating the version of the website that is requested, wherein the version of the website is defined based on a device type, and a device on which the web browser is operating is different than the device type. The method also includes transmitting the version of the website to the device on which the web browser is operating.

In a third illustrative embodiment, one or more computer-readable media having computer-executable instructions embodied thereon for performing a method of specifying a version of a website in a request for the website are provided. The method includes displaying, in association with a web browser, a user interface for specifying the version of the website. The method also includes receiving a selection of the version of the website from a user, wherein the version of the website is specified according to a type of device for which the version of the website is optimized. The method includes generating an HTTP website request including the attribute value corresponding to the version of the website.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for allowing a user to request a specific version of a website. Many content providers build multiple versions of a single website. Each version is optimized for viewing with different web browsers or classes of web browsers. For example, a version of a website may be optimized for display on a mobile telephone or with a particular company's web browser. Typically, a content provider will chose the website version based on characteristics of the requesting web browser. Embodiments of the present invention provide a user interface that allows a user to select a website version. The requested website version is then sent to the web server. The web server then provides the requested website version to the requesting web browser without considering the characteristics of the requesting web browser.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. Further, various technical terms are used throughout this description. An illustrative resource that fleshes out various aspects of these terms can be found in *Newton's Telecom Dictionary* by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

An Illustrative Operating Environment

Figure 1:
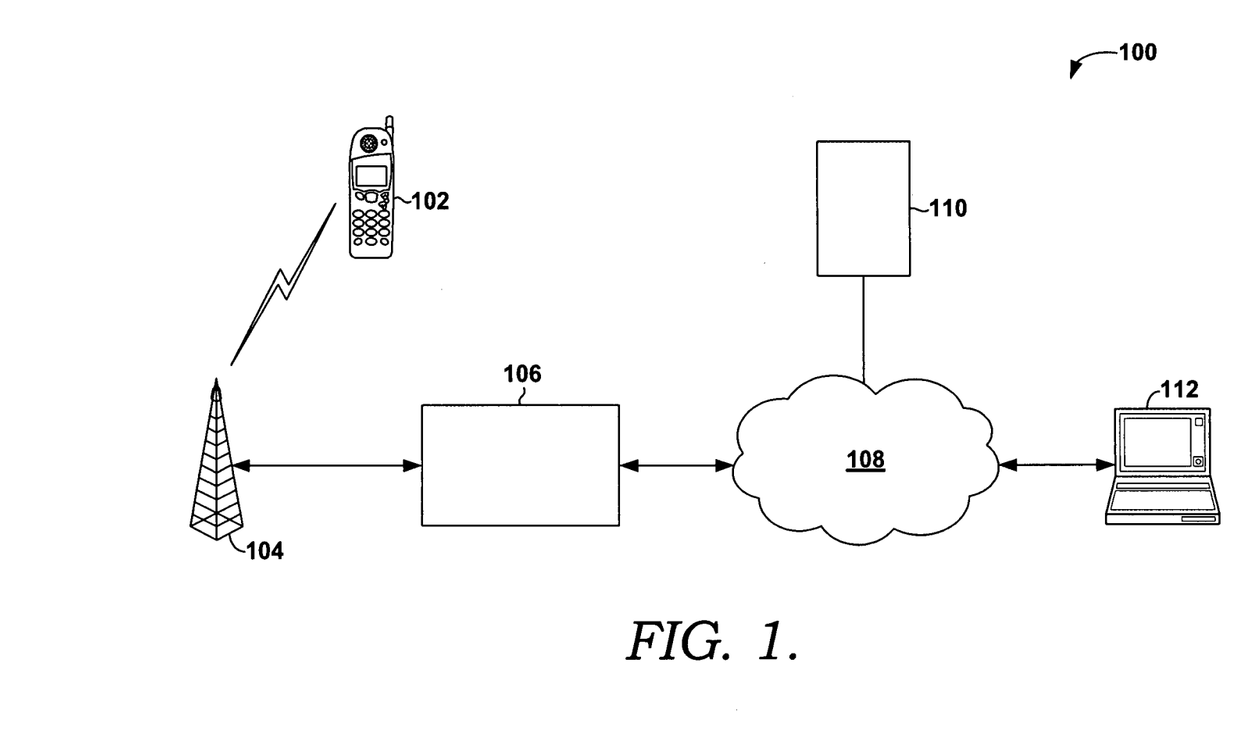
FIG. 1 is a drawing of an illustrative environment in which an embodiment of the present invention may operate.

Embodiments of the present invention may be practiced in a communications network providing service to devices communicatively coupled to the communications network. An illustrative operating environment 100 that contains a few of the components within such a communications network is shown in FIG. 1. The components shown in FIG. 1 are the primary components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and not meant to be limiting.

Illustrative operating environment 100 includes mobile device 102, base station 104, access gateway 106, network 108, webpage server 110, and communications device 112. The present invention is not limited to embodiments that include a wireless device or a wireless network. However, the present invention may operate in a wireless network and with wireless devices. Accordingly, a wireless network has been included in illustrative operating environment 100 to illustrate one possible operating environment.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of receiving one or more forms of textual communications. Examples of communications that may be received include text messages, multimedia messages, emails, calendar updates, and task reminders.

The mobile device 102 may be associated with a user. For example, a phone call placed to mobile device 102 would be intended for the user. The user is the ultimate recipient of communications (e.g., emails, phone calls, text messages) and media content sent to mobile device 102.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Access gateway 106 provides a boundary between radio communication functions embodied in one or more radio access systems that form the access-facing portion of illustrative operating environment 100 and the standard internet protocol ("IP") communication functions (including Mobile IP) embodied in the public-network facing portion (e.g., network 108) of illustrative operating environment 100. Access gateway 106 might be, for example, an ASN-GW, a PDSN, a SGSN/GGSN, and the like. In embodiments, access gateway 106 can be coupled with a foreign agent ("FA"). In one embodiment, access gateway 106 provides a home agent ("HA") header data to packets such that packets received by access gateway 106 may be communicated to a HA. Packets might be tunneled to and from a HA over unencrypted IP-in-IP tunneling.

Network 108 may include one or more mobile networks, one or more packet-based networks, including the Internet, and the public switched telephone network ("PSTN"). The various components within network 108 may be owned and/or operated by multiple entities, commercial or otherwise. Network 108 is configured to transmit a variety of communication formats including phone calls, emails, text messaging, faxes, instant messaging, pages, voice mails, photographs, audio files, movies, TV shows, calendar reminders, task reminders, and other files containing communicative content.

Content server 110 is a combination of hardware and software for transmitting web pages and other content to a requesting web browser. The hardware aspect includes a computing device that includes a CPU, short-term memory, long-term memory, and one or more network interfaces. A network interface is used to connect to a LAN, WAN (including the Internet), or other variety of communication network, such as network 108. The network interface to the WAN or LAN could be wired, wireless, or both. Software on the content server 110 allows the content server 110 to communicate with other computers connected to a common network through the network interface. The software facilitates receiving requests for web pages, retrieving the requested web page, and transmitting the requested web page to the requesting browser. The software may also provide security and authentication functions. The content server 110 includes a variety of computer-readable media and the ability to access and execute instructions contained on the media. The above description of hardware and software is illustrative only; many other features of a content server were not listed so as to not obscure embodiments of the present invention.

In one embodiment, upon receiving a request for a particular website, the content server 110 may select one of several versions of the particular website to transmit to the user. Content providers may generate different versions of the same website to optimize the appearance of the website on different web browsers. For example, content server 110 may return a first version of the website when the request comes from a browser designed to operate on a cell phone and a second version of the website when the request comes from a web browser designed to operate on a personal computer. In general, personal computers have the processing power and screen real estate to receive more robust web pages. Such a web page may not be effectively viewable on a cell phone. Thus, a content server 110 may provide a less robust version of the requested website to a browser typically associated with a cell phone. Presently, the content server 110 may look at an x-wap-profile, client ID, or IP address of the service provider's proxy server to determine which type of web browser is requesting the website. The type of web browser may then be used to determine which version of the requested website to return. Embodiments of the present invention bypass these indirect methods of determining which version of the website to return by providing a request for the specific website version to return. This allows, for example, a user of a cell phone to specifically request the full HTML version of a web page typically sent to a PC or the user of a PC to specifically request the version of the website typically sent to a cell phone. Since the website's versions are designed based on the type of web browser, the request may specify the website version in terms of a type of web browser.

Computing device 112 is depicted as a laptop computer. Some lower-level details of computing device 112 are not shown so as to not obscure embodiments of the present invention. For example, computing device 112 may include a bus that directly or indirectly couples the following devices: memory; one or more processors; one or more presentation components such as a display or speaker; input/output (I/O) ports; I/O components; and a power supply such as a battery. Computing device 112 may take on any of a variety of forms including a laptop, desktop, or handheld computer.

Figure 2:
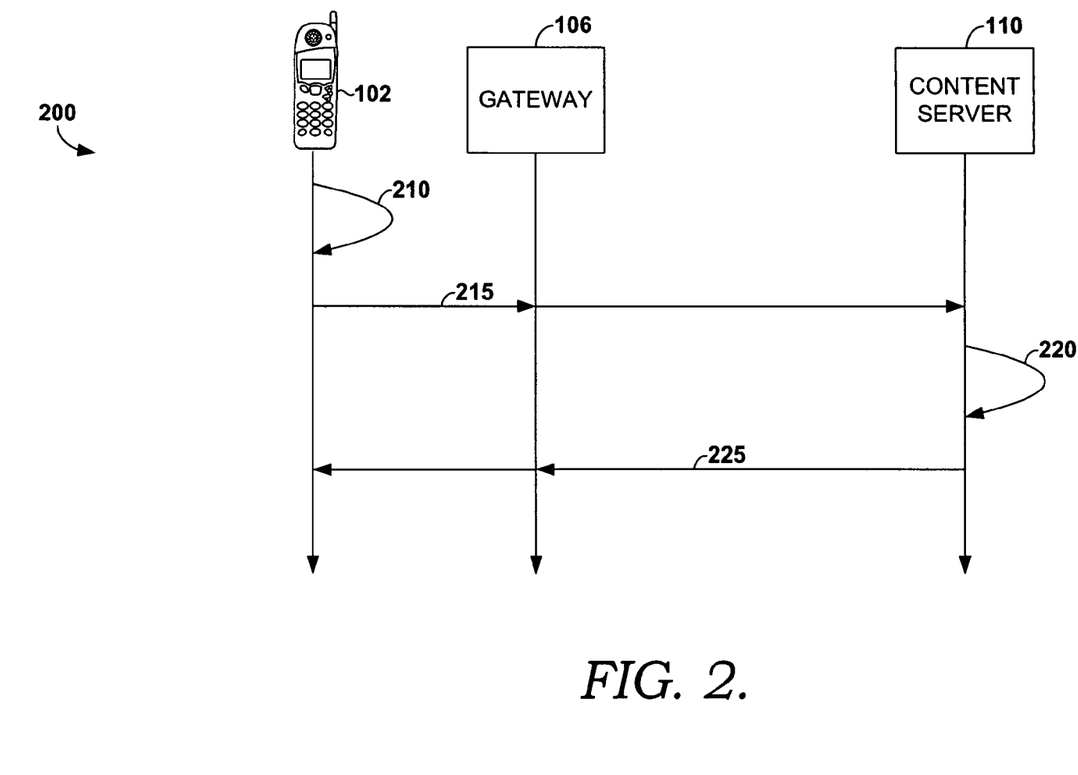
FIG. 2 is a drawing illustrating communications between a web browser on a communications device and a content provider, in accordance with an embodiment of the present invention.

Turning now to FIG. 2, a diagram illustrating communications between a web browser on a communications device 102 and a content server 110 is shown, in accordance with an embodiment of the present invention. The communications device 102, gateway 106, and content server 110 have been described previously with reference to FIG. 1. Initially, the communications device 102 receives input from a user indicating the web site version to request. The indication 210 is used to generate request 215, which is transmitted through the gateway 106 through a network such as network 108, to content server 110. In one embodiment, request 215 is an HTTP GET request. The website version may be specified in the HTTP GET request by designating a header in the HTTP GET request for this purpose. The header may be defined as a multi-valued attribute. This provides the flexibility to request multiple website versions. Gateway 106 may need to be updated to recognize that the new header attribute is valid. Failing to update gateway 106 may cause the HTTP GET request containing the new header to be rejected in whole or in part.

The content server 110 receives request 215 and searches for a website version indicated by the request. Absent the request, the content server 110 may have other algorithms for determining which website version to return. However, these other algorithms should not be used by content server 110 when a specific website version is requested in the request 215. For example, using other methods, the content server 110 may determine that the browser operating on communications device 102 is designed for a mobile communications device and retrieve a website version built to be viewed on mobile devices. The other method should not be used if a specific website version is requested. For example, if the mobile device 102 has requested a full HTML version designed for personal computers then the requested full version should be returned even though the content provider would otherwise return a mobile version of the website. The correct website version is retrieved 220 and transmitted 225 back to communications device 102. If the requested website version is not available the closest available website version may be retrieved.

Figure 3:
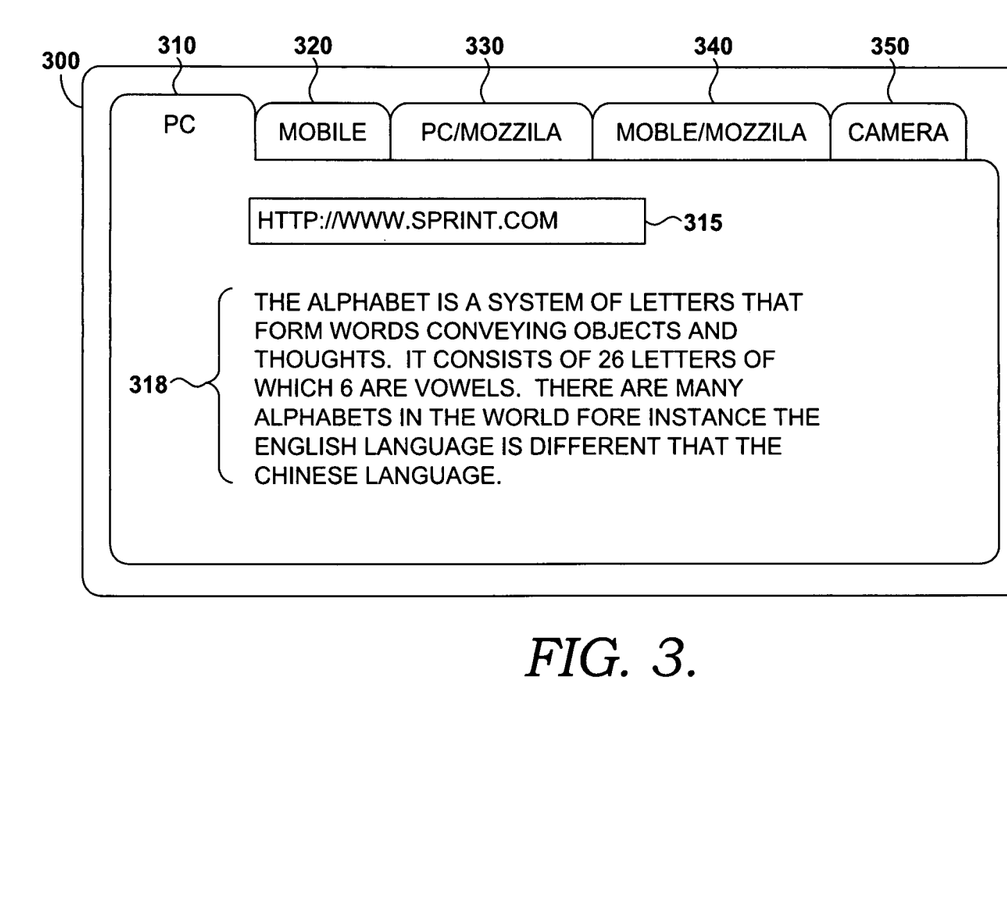
FIG. 3 is a drawing illustrating a graphical user interface for selecting a website version, in accordance with an embodiment of the present invention.

Turning now to FIG. 3, a user interface for selecting a website version is shown, in accordance with an embodiment of the present invention. User interface 300 may be generated by a web browser. The user interface is broken into tabs 310, 320, 330, 340, and 350. Each tab is associated with a particular website version identified by the type of browser for which the website version is optimized. Thus, tab 310 is associated with the type of web browser optimized to view on a personal computer. Tab 320 is associated with the type of web browser typically optimized for viewing on a mobile communications device such as a PDA, cell phone, or Smartphone. Tab 330, is associated with a type of browser optimized for viewing with a particular type of web browser on a PC. In this case, Mozilla is the particular type of web browser. Tab 340 requests a web page optimized for viewing on a mobile browser provided by Mozilla. Tab 350, is associated with a web browser optimized for viewing on a digital camera. Tab 310 is shown selected in user interface 300. Tab 310 contains an input field 315 into which a web address may be entered. In one embodiment, upon entering a web address in input field 315 a request is generated for the version of the website entered into input field 315 and indicated on tab 310 (e.g., PC). The web page content 318 from the requested web page version may then be displayed.

Figure 4:
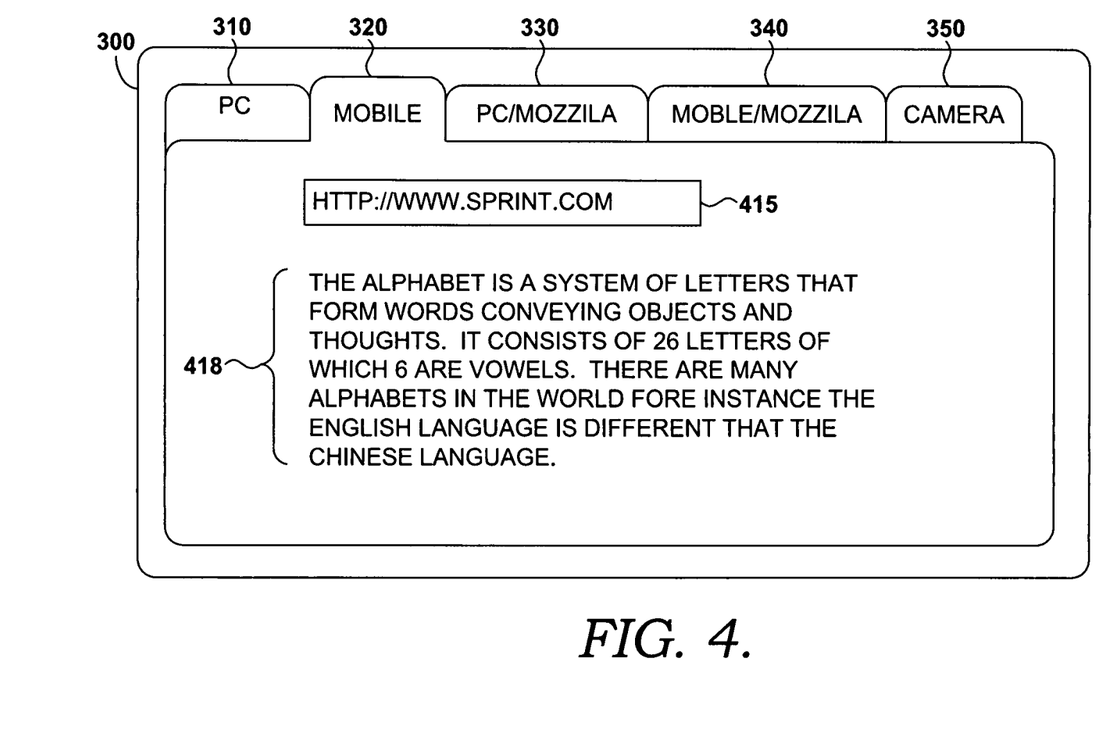
FIG. 4 is a drawing of a user interface for selecting a version of a website, in accordance with an embodiment of the present invention.

Turning now to FIG. 4, a user interface for selecting a version of a website is shown, in accordance with an embodiment of the present invention. User interface 400 contains the same five tabs 310, 320, 330, 340, and 350, explained previously with reference to FIG. 3. FIG. 4 illustrates the appearance of user interface 300 when tab 320 is selected. Tab 320 contains an input field 415. Upon receiving a web address in input field 415 a request may be generated for the version of the website corresponding to a mobile device. The website is then returned and content 418 is displayed in the user interface 400.

Figure 5:
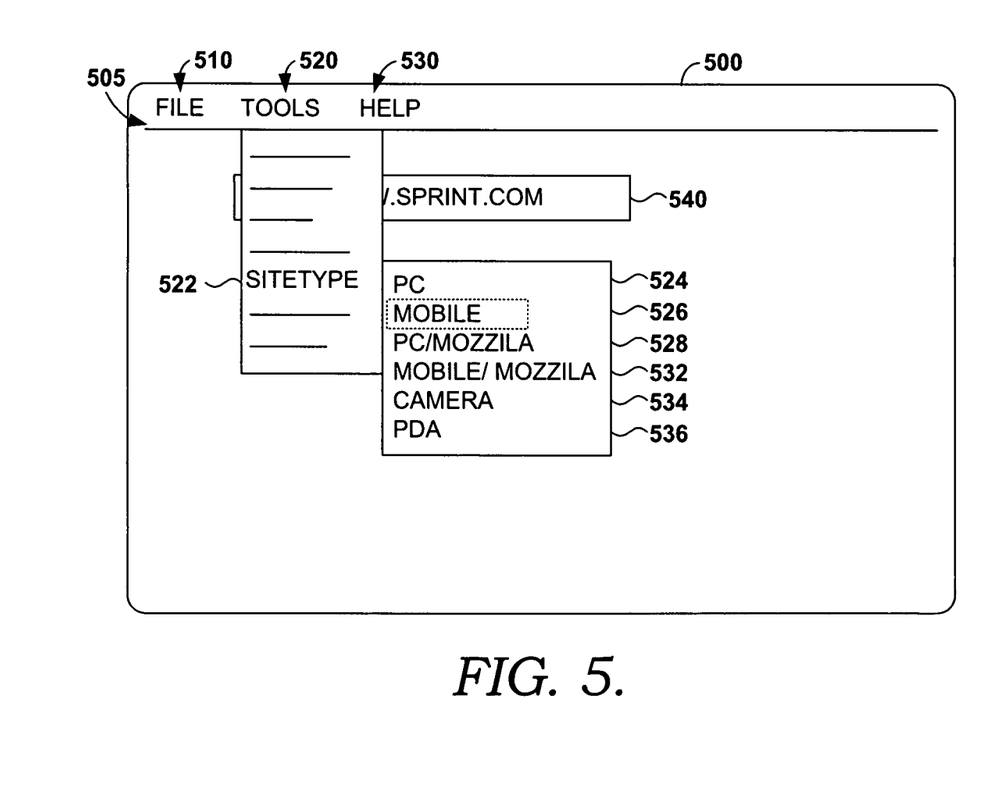
FIG. 5 is a drawing illustrating a user interface allowing the user to select a website version through a file menu, in accordance with an embodiment of the present invention.

Turning now to FIG. 5, a user interface allowing the user to select a website version through a file menu is shown, in accordance with an embodiment of the present invention. User interface 500 may be associated with a web browser. The menu bar 505 contains the file dropdown menu 510, the tools dropdown menu 520, and the help dropdown menu 530. These dropdown menus are merely illustrative, and more or less menus could be provided according to the preference of the designer. In user interface 500, a sitetype option 522 is provided underneath the tools dropdown menu 520. Upon selecting sitetype option 522 six selection options are displayed. Each selection option would cause the request to specify a particular website version. Selection option 524 would cause a website version optimized for a personal computer to be requested. Selection option 526 would cause a website version optimized for a mobile device to be requested. Selection option 528 would cause a website version optimized for a personal computer and a browser provided by Mozilla to be requested. Selection option 532 indicates a website version optimized for a mobile browser provided by Mozilla to be requested. Selection option 534 causes a website browser optimized for a digital camera to be requested. And selection option 536 causes a website version associated with a PDA to be requested. An input field 540 for receiving a website address is also included in user interface 500. The sitetype option is not limited to inclusion in the tools 520 dropdown menu. The sitetypes could be placed directly on the menu bar 505 or as an item in any of the other dropdown menus. Other methods of receiving selections such as providing an icon link to a wizard, radio buttons, a short key, or any other method could be used.

Figure 6:
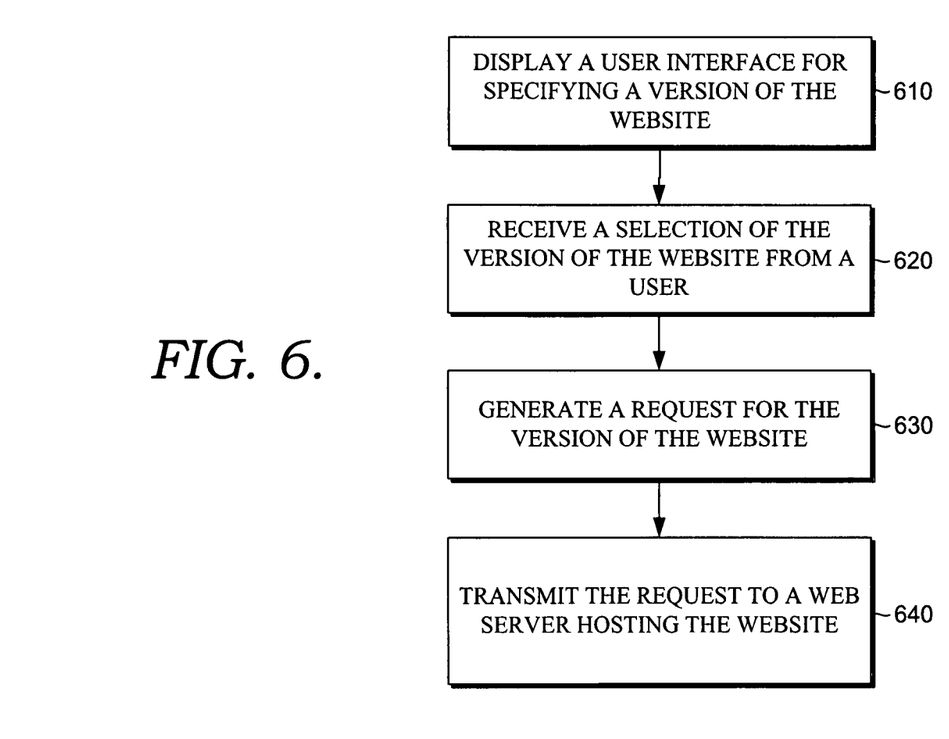
FIG. 6 is a flow diagram in which a method of requesting a version of a website is described, in accordance with an embodiment of the present invention.

Turning now to FIG. 6, a method of requesting a website version is shown, in accordance with an embodiment of the present invention and designated generally with numeral 600. At step 610, a user interface for specifying a version of a website is displayed. Examples of suitable user interfaces have been described previously with reference to FIGS. 3-5. In general, the website version may be described by the web browser for which the version is optimized. The website version may be described in terms of the browser provider, a class of browsers optimized for a particular hardware device, or a combination of browser class and browser provider. For example, a website version may be requested that is optimized for the class of browsers optimized to operate on a mobile phone. In another example, a website version may be requested as provided by Mozzila and in the class of browsers optimized to operate on a mobile phone.

At step 620, a request for a specific version of a website is received from a user through the user interface. At step 630, a request for the specific version of the website, based on a type of web browser, is generated. In one embodiment, the request is part of an HTTP GET request. As explained previously, the website version may be described in an attribute within a header in the HTTP request. Any method of assigning attribute values within the header may be used so long as the receiving content provider understands the attribute values. In one embodiment, a multi-valued attribute is used to specify the website version.

At step 640 the request is transmitted to a web server hosting the requested website. It is not necessary for the content provider to understand the request for the method to be fully performed. For example, some content providers may only provide one version of a requested website, or may choose not to take advantage of the specific website version request made by the user. In such a case, the content provider just ignores the request.

Figure 7:
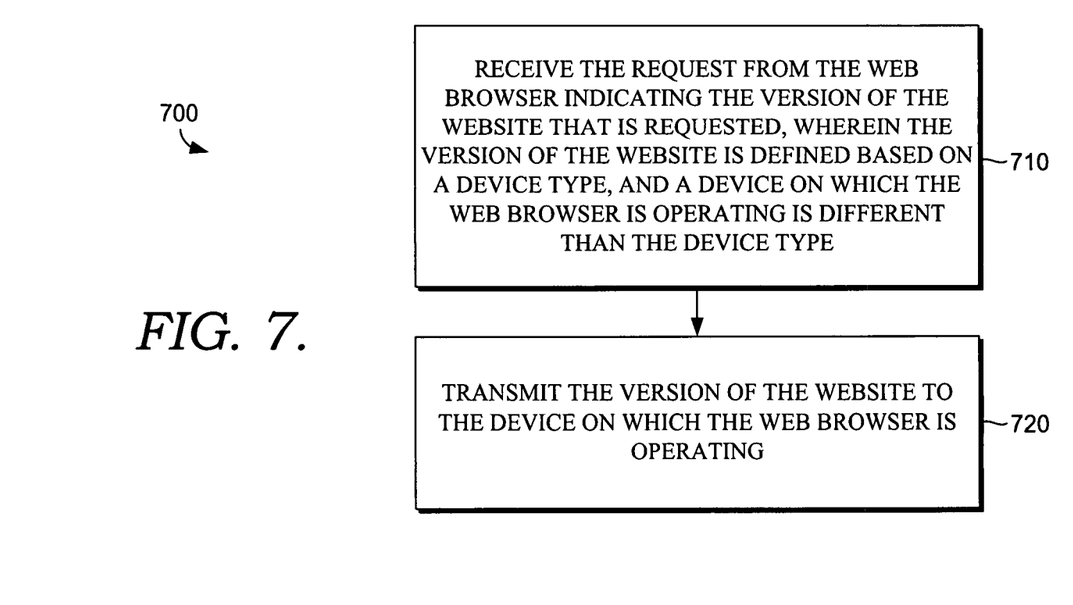
FIG. 7 is a flow diagram in which a method of presenting a requested website version in response to a request from a web browser is shown, in accordance with an embodiment of the present invention.

Turning now to FIG. 7, a method of presenting a requested website version in response to a request from a web browser is shown, in accordance with an embodiment of the present invention and designated generally with numeral 700. At step 710, a request from a web browser indicating a website version to transmit to the web browser is received. The website version is defined based on at least a device type (e.g., PC, mobile phone, camera, game console). Further, the device on which the web browser is operating is different than the requested device type. Thus, a user of a device may request a website version other than what would typically be provided to the requesting browser based on the type of device for which the requesting browser is optimized. For example, a user of a mobile phone may request the PC version of the website.

At step 720, the website version corresponding to the request is retrieved and transmitted to the device on which the web browser is operating. If the requested website version is not available, the content provider receiving the request may provide the closest available website version. For example, if the request specifies a device type and a web browser provider and a website version is available for the device type, but not the web browser provider, then the website version optimized for the device type should be returned to the user. In one embodiment, a preference is given to the requested device type over the requested browser provider to determine the closest available website version when an exact match is not found. For example, a website version optimized for device type B would be returned in response to a request specifying browser provider A and device type B where a website version exists that is optimized for device type B that is not optimized for a browser from provider A and a website version exists that is optimized for a web browser by provider A that is not optimized for device type B. As indicated previously, the device type may be specified in terms of a mobile communication device, a mobile telephone, a cell phone, a PDA, a Smartphone, a laptop computer, a desktop computer, a videogame console, a digital camera, or a digital book presentation device, among other device options.

Figure 8:
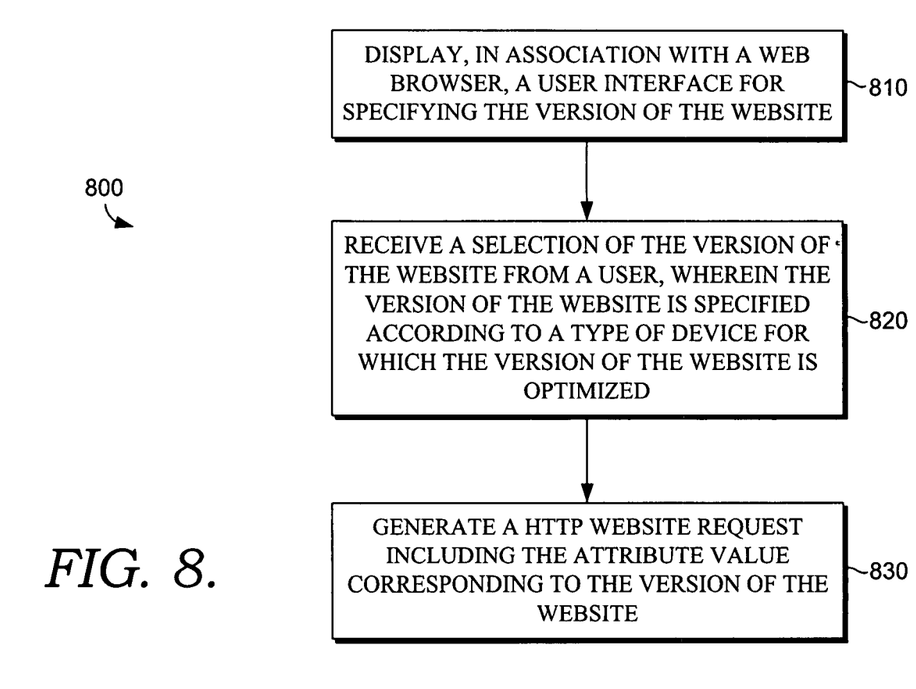
FIG. 8 is a flow diagram in which a method of specifying a version of a website in a request for a website is shown, in accordance with an embodiment of the present invention.

Turning now to FIG. 8, a method of specifying a website version in a request for a website is shown, in accordance with an embodiment of the present invention and designated generally with numeral 800. At step 810, a user interface for specifying a website version is displayed in association with a web browser. Examples of such a display have been explained previously with reference to FIGS. 3-5. At step 820, a request for a specific website version is received from a user. The website version may be specified according to the type of device for which the website version is optimized. In one embodiment, the website version is requested by selecting a portion of a touch screen display. In another embodiment, the website version is selected in part by moving the computing device on which the web browser is operating. For example, the computing device may be tilted to indicate a particular website version is desired. At step 830, an HTTP website request is generated that includes an attribute value corresponding to the requested website version. The HTTP website request is communicated to the desired content provider.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of requesting a version of a website, the method comprising:
   displaying, on a mobile device, a user interface for enabling a user of the mobile device to specify the version of the website, wherein the version of the website comprises one of a plurality of versions of the website provided from a web server hosting the website and wherein the user interface is displayed as part of a web browser;

receiving a selection of the version of the website from the user of the mobile device;

generating a request for the website, wherein the request is an HTTP GET request, wherein the request specifies a type of web browser corresponding to the selection of the version of the website from the user; and transmitting the request to the web server hosting the website, wherein the request is the first request sent from the web browser to the web server, wherein the version of the website is communicated as an attribute value in an HTTP header.

2. The media of claim 1, wherein displaying the user interface includes displaying a selectable tab describing the type of web browser.

3. The media of claim 1, wherein displaying the user interface includes providing a menu from which the user may select the type of web browser.

4. The media of claim 1, wherein the request specifies the type of web browser at least in part by specifying a type of computing device on which the type of web browser is designed to operate.

5. The media of claim 4, wherein the type of computing device includes one or more of a mobile communication device, a mobile telephone, a PDA, a smart phone, a laptop, a desktop computer, a video game console, a digital camera, and a digital book presentation device.

6. The media of claim 1, wherein the request specifies the type of web browser by specifying one or more of brand name, program name, and software version.

\* \* \* \* \*